(12) United States Patent
Goes et al.

(10) Patent No.: US 9,194,325 B2
(45) Date of Patent: *Nov. 24, 2015

(54) METHOD AND KIT FOR ENGINE EMISSION CONTROL

(71) Applicant: General Electric Company, Schenectady, NY (US)

(72) Inventors: Ryan John Goes, Chicago, IL (US); Shawn Gallagher, Erie, PA (US); Eric Dillen, Erie, PA (US); Rajani Boddu, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/546,449

(22) Filed: Nov. 18, 2014

(65) Prior Publication Data
US 2015/0073683 A1 Mar. 12, 2015

Related U.S. Application Data

(63) Continuation-in-part of application No. 13/334,276, filed on Dec. 22, 2011, now Pat. No. 8,903,623, which is a continuation-in-part of application No. 12/632,561, filed on Dec. 7, 2009, now Pat. No. 8,090,521.

(51) Int. Cl.
| | |
|---|---|
| *B60T 7/12* | (2006.01) |
| *F02D 41/40* | (2006.01) |
| *F02D 41/00* | (2006.01) |
| *B61C 5/00* | (2006.01) |
| *B61C 5/02* | (2006.01) |
| *F02M 35/10* | (2006.01) |
| *F02M 35/16* | (2006.01) |
| *F02D 41/22* | (2006.01) |
| *F02D 25/00* | (2006.01) |
| *F02D 41/02* | (2006.01) |

(52) U.S. Cl.
CPC ............... *F02D 41/401* (2013.01); *B61C 5/00* (2013.01); *B61C 5/02* (2013.01); *F02D 25/00* (2013.01); *F02D 41/0025* (2013.01); *F02D 41/0082* (2013.01); *F02D 41/22* (2013.01); *F02M 35/1038* (2013.01); *F02M 35/164* (2013.01); *F02D 41/021* (2013.01); *F02D 41/222* (2013.01); *F02D 2200/0414* (2013.01); *F02D 2200/0416* (2013.01); *F02D 2200/50* (2013.01); *Y02T 10/44* (2013.01); *Y02T 30/10* (2013.01)

(58) Field of Classification Search
CPC ............................. F02D 41/401; F02D 35/025
USPC ........... 701/102–105, 114, 115; 123/435, 689
See application file for complete search history.

(56) References Cited

U.S. PATENT DOCUMENTS

| | | | | |
|---|---|---|---|---|
| 7,213,566 | B1 * | 5/2007 | Jankovic et al. | 123/302 |
| 7,657,365 | B2 * | 2/2010 | Fukushima et al. | 701/110 |
| 8,090,521 | B2 * | 1/2012 | Goes et al. | 701/105 |
| 2009/0107456 | A1 * | 4/2009 | Pallett et al. | 123/299 |
| 2009/0118976 | A1 * | 5/2009 | Fukushima et al. | 701/103 |
| 2010/0042308 | A1 * | 2/2010 | Kobayashi et al. | 701/104 |

\* cited by examiner

*Primary Examiner* — John Kwon
(74) *Attorney, Agent, or Firm* — GE Global Patent Operation; John A. Kramer

(57) ABSTRACT

Methods and systems are provided for operating an engine including a first and a second bank of cylinders. One example method comprises, adjusting engine injection timing based on a first temperature of a first intake of the first bank and a second temperature of a second intake of the second bank.

20 Claims, 3 Drawing Sheets

METHOD AND KIT FOR ENGINE EMISSION CONTROL

CROSS REFERENCE TO RELATED APPLICATIONS

This application is a continuation-in-part of U.S. patent application Ser. No. 13/334,276 filed Dec. 22, 2011, which is a continuation-in-part of U.S. patent application Ser. No. 12/632,561 filed Dec. 7, 2009, now U.S. Pat. No. 8,090,521 issued Jan. 3, 2012, the disclosures of which are incorporated by reference in their entireties for all purposes.

FIELD

The subject matter disclosed herein relates to a method, system, and kit for controlling exhaust emissions by adjusting injection timing in a vehicle, such as a locomotive.

BACKGROUND

Locomotive engine control systems may perform emissions control by adjusting injection timing responsive to manifold air temperature (MAT). For example, input from a MAT sensor coupled to the intake manifold of a first bank of cylinders of the locomotive engine may be used to adjust an injection timing retard of both a first and second bank of cylinders of the engine, to thereby address elevated emissions levels (e.g., NOx levels). Each bank of the locomotive engine may further include a dedicated intercooler in the respective intake manifold for cooling air charge, such as a boosted air charge, introduced into the bank The inventors herein have recognized that intake components, such as bank-specific intercoolers and MAT sensors, may degrade at different rates. For example, an intercooler coupled to the intake of one bank may provide less charge cooling than the intercooler coupled to the intake of another bank. As another example, with a single bank-specific MAT sensor, component degradation in the other bank may go undetected. In these example scenarios, it is possible that the levels of some exhaust emissions may be higher than anticipated (although the exhaust emissions would be expected to remain at or below the applicable regulated levels).

BRIEF DESCRIPTION OF THE INVENTION

Methods, systems, and/or kits are provided for operating an engine including a first and a second bank of cylinders. In one embodiment, the method includes adjusting an injection timing of a fuel injector coupled to the first bank of cylinders and a fuel injector coupled to the second bank of cylinders based on an unevenly weighted average of a first temperature of a first intake of the first bank and a second temperature of a second intake of the second bank. The unevenly weighted average may be adjusted during engine operation based on an engine operating parameter.

In one example, a respective dedicated manifold air temperature (MAT) sensor may be included in the intake manifold of each of a first bank and second bank of a locomotive (or other vehicle) split engine system. An engine controller, such as an on-board control system, may be configured to adjust an engine fuel injection timing (e.g., an injection timing retard) of both banks of cylinders based on a first and second temperature output from the two MAT sensors. For example, the controller may adjust the injection timing based on an unevenly weighted average of the first and second temperature. The unevenly weighted average may include a larger weight factor for the higher of the first and second temperatures and a smaller weight factor for the lower of the first and second temperatures. In addition, the weight factors may vary during engine operation based on an operating parameter, such as an engine component age. Alternatively, the controller may adjust the injection timing of fuel injectors coupled to each bank based on the temperature of the respective cylinder bank.

The engine controller may be in serial communication with a locomotive controller. The locomotive controller may be configured to adjust engine settings and/or perform diagnostic routines based on information received from the engine controller via the serial communication link. As used herein, serial communication may include digital communication where data is communicated, in either direction, one bit at one time, sequentially, over the communication link. In one example, a diagnostics routine may be executed to identify degradation in at least one of a first intercooler in the first bank and a second intercooler in the second bank based on the first and second temperature. For example, the estimated first and second temperatures and engine injection timing details may be uploaded from the engine controller to the locomotive controller. Based on differences between the first and second temperature, and/or based on differences between the temperatures and an expected MAT, the locomotive controller may determine degradation of at least one of the intercoolers. The expected MAT may be modeled using inputs such as an engine speed, an engine torque, an engine boost, an ambient temperature, altitude, humidity, etc. In one example, intercooler degradation may be determined when a difference between the first and second temperatures is greater than a threshold. Additionally or optionally, intercooler degradation may be determined based on a difference between the expected MAT and either the first or second temperature being greater than a threshold.

As such, in the absence of intercooler degradation detection, manifold temperatures may become elevated, leading to elevated exhaust NOx levels and reduced margin to allowable limits. The locomotive may continue to operate assuming emissions compliance, without appropriately adjusting injection timing. Thus, following intercooler degradation determination, the injection timing may be further adjusted, for example, by an engine controller, by performing an injection timing adjustment independent from the temperature of the bank with the degraded intercooler. The injection timing may also be further adjusted based on locomotive operating conditions, such as an amount of auto engine start stop (AESS) operation, the presence of AESS emission credits, etc. The further adjusted injection timing may then be transferred to the engine controller, for example, via the serial communication link, for accordingly adjusting engine operations. As such, by enabling serial communication between an engine controller and a locomotive controller, a larger range of engine control modes may be commanded, thereby improving engine performance characteristics.

In this way, by incorporating MAT details of both banks from multiple MAT sensors, injection timing precision may be improved. By adjusting injection timing responsive to MAT of both banks of the engine, exhaust emissions may be improved. Furthermore, by reducing emissions margins, fuel savings may be improved. By comparing MAT readings from both banks of the locomotive engine to an expected MAT, component damage (e.g., intercooler and/or MAT sensor damage) may be detected and addressed. Furthermore, by adding a second MAT sensor, component redundancy may be introduced to further ensure emissions compliance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
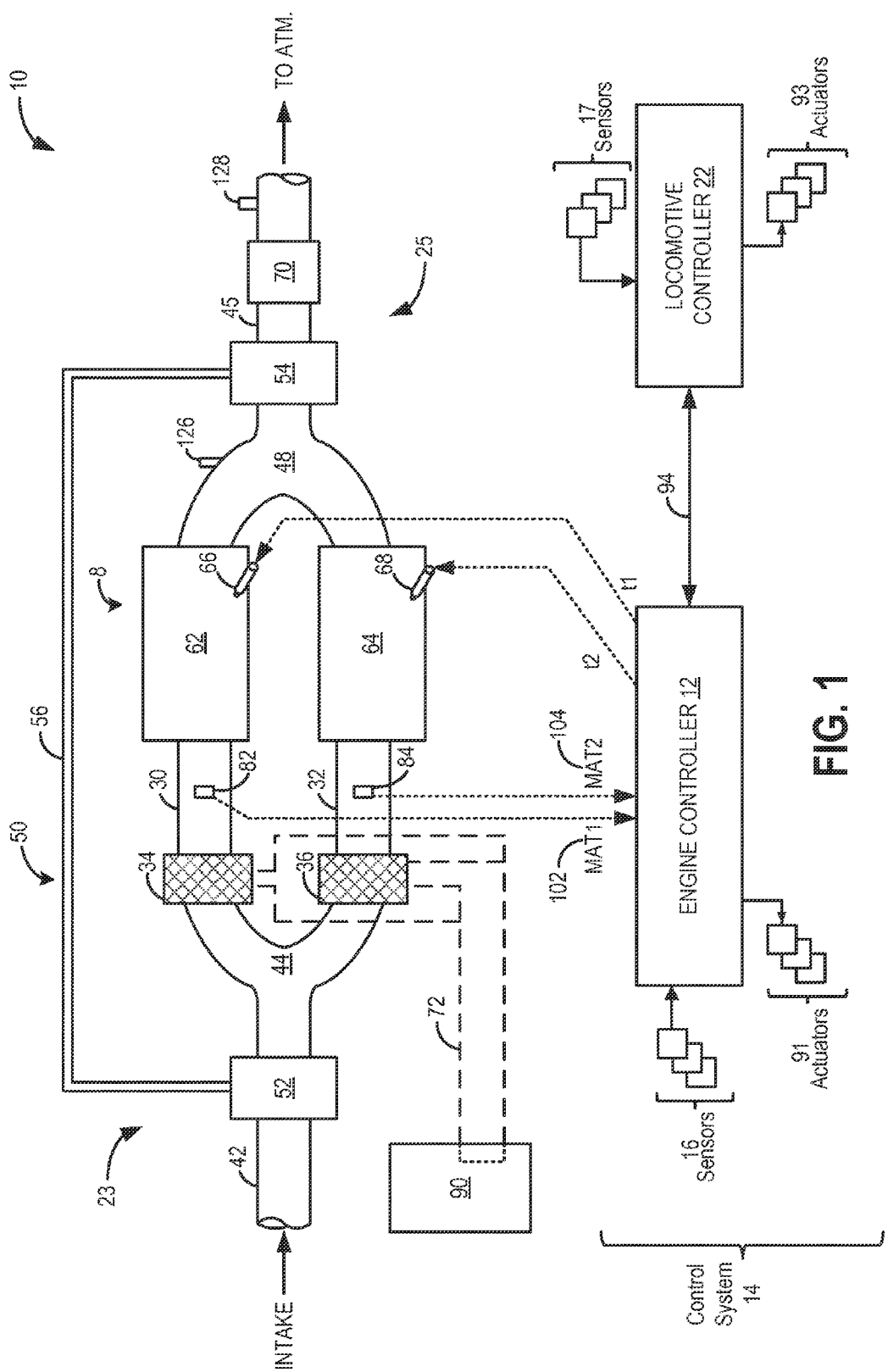
FIG. 1 shows an example embodiment of a locomotive split engine system including two banks.

Vehicles, such as locomotives, may be configured with split engine systems. One example of such an engine system is illustrated in FIG. 1, wherein the engine includes two banks of cylinders. Intake air, compressed by a boosting device, may be split downstream of the compressor, and at least some compressed intake air may be diverted to each bank via independent intake manifolds. Further, each intake manifold may include a dedicated intercooler for cooling the received compressed intake air. An engine controller may be configured to adjust engine settings based on operating conditions of each bank. For example, as illustrated with reference to FIG. 2, based on a first temperature of the first intake as estimated by a first manifold air temperature (MAT) sensor, and a second temperature of the second intake as estimated by a second manifold air temperature (MAT) sensor, the controller may adjust an engine injection timing. For example, the engine injection timings for each bank may be adjusted based on an unevenly weighted average of the first and second temperatures, or, the injection timing of each bank may be adjusted based on that bank's manifold air temperature, and independent of the other bank's temperature.

The engine controller may be in serial communication with a locomotive controller located on the locomotive that adjusts engine output, traction, cooling, and various other locomotive functions. The locomotive controller may be configured to receive engine operating data from the engine controller in addition to receiving locomotive operating data from various locomotive sensors. As illustrated with reference to FIG. 3, based on input received regarding locomotive operating conditions and engine operating conditions, the locomotive controller may determine a locomotive performance plan and an engine performance plan. The engine performance plan, including engine settings, may then be relayed to the engine controller, via the serial communication link, for adjusting engine operations accordingly. For example, based on the first and second temperatures, the locomotive controller may be configured to diagnose degradation of one of the intercoolers in the first and second bank. An injection timing (of one or both banks) may then be adjusted based on the determination of intercooler degradation. In this way, by using serial communication, engine and locomotive performance may be improved. By adjusting engine injection timing based on the first and second bank temperatures, emissions error margins may be reduced, thereby reducing fuel consumption.

FIG. 1 depicts a split engine system 10 that may be included in a vehicle or vehicle system, such as a locomotive. Split engine system 10 may include a split engine 8 with a first bank of cylinders 62 and a second bank of cylinders 64. As depicted, the two banks may be independent banks, with a common exhaust. In one example, engine 8 may be a diesel engine. However, in alternate embodiments, alternate engine configurations may be employed, such as a gasoline engine, a biodiesel engine, or a natural gas engine, for example.

Engine 8 includes an intake 23 and an exhaust 25. The exhaust 25 includes an exhaust manifold 48 leading to an exhaust passage 45 that routes exhaust gas to the atmosphere. Exhaust passage 45 may include one or more emission control devices 70, which may be mounted in a close-coupled position in the exhaust. One or more emission control devices may include a three-way catalyst, lean NOx trap, oxidation catalyst, etc.

Engine 8 may further include a boosting device, such as a turbocharger 50, including a compressor 52 arranged along intake passage 42. Compressor 52 may be at least partially driven by a turbine 54, arranged along exhaust passage 45, via shaft 56. In alternate embodiments, the boosting device may be a supercharger, wherein compressor 52 may be at least partially driven by the engine and/or an electric machine, and may not include a turbine.

Intake manifold 44 may be split downstream of the compressor into a first intake 30, configured to direct at least some compressed air to first bank 62, and a second intake 32, configured to direct at least some compressed air to second bank 64. Each bank may further include an independent intercooler (although they may share an intercooler in alternate embodiments). A first intercooler 34 may be included in first intake 30 to reduce the temperature of the boosted air charge supplied to the first bank 62 of cylinders. Similarly, a second intercooler 36 may be included in second intake 32 to reduce the temperature of the boosted air charge supplied to the second bank 64 of cylinders. Intercoolers 34 and 36 may be coupled to engine cooling system 90 via cooling loop 72 that splits the coolant into two parallel paths, one for each intercooler. Engine cooling system 90 may include, for example, radiators, fans, coolant tank, coolant pump, etc., for cooling the compressed intake air. In this example, the intercoolers share a common coolant (e.g., a water-based coolant). In this way, differences in bank-to-bank MAT can be attributed to changes in intercooler performance since both banks are supplied with the same coolant.

As such, each intercooler may degrade at a different rate. For example, each intercooler may undergo mechanical degradation at a different rate. This may be due to, for example, one intercooler losing fin contact, or due to a cooling pipe of one intercooler getting restricted. In another example, each intercooler may degrade at a different rate due to different degrees of fouling by soot or dirt. As such, intercooler degradation may lead to elevated manifold temperatures and elevated emissions from the corresponding bank. As elaborated in FIG. 2, intercooler degradation may be promptly diagnosed based on the temperature of the first and second bank. Further, based on the indication of intercooler degradation, engine injection timings may be adjusted to thereby enable engine emissions to remain within regulation-permitted levels.

As used herein, degradation may refer to the degradation over time of a component, however, the component may still provide functionality within expected design limits and thus maintain sufficient emissions margin relative to emission compliance. However, components may also degrade beyond acceptable limits to a degree requiring replacement, which may be referred to as excessive degradation.

As used herein, adjustment of engine injection timing (e.g., fuel injector injection timing) may include adjusting a start of injection timing, and/or adjusting an end of injection timing. For example, an injector may have an opening timing, an opening duration, and a closing timing. The opening duration, among other parameters such as injection pressure, may be adjusted to control the amount of fuel injection. However, even while maintaining the amount of fuel injection at the same desired level, the timing of when, in relation to piston motion or the combustion cycle, the fuel is delivered, may also be adjusted. As noted above, the amount of fuel delivered may be maintained, yet the timing relative to the piston motion may be delayed (retarded), or advanced, by delaying (or advancing) both the opening and closing of the injector opening.

A first manifold air temperature (MAT) sensor 82 may be positioned downstream of first intercooler 34 in first intake 30 to estimate a first temperature 102 (MAT1) of intake air supplied to first bank of cylinders 62. A second MAT sensor 84 may be positioned downstream of second intercooler 36 in second intake 32 to estimate a second temperature 104 (MAT2) of intake air supplied to second bank of cylinders 64. As elaborated in FIG. 2, injection timing of the two banks of cylinders may be determined based at least on the first and second temperature 102, 104. For example, a weighted average (e.g., an unevenly weighted average) of the first and second temperature may be used. By averaging MAT between the two banks for injection timing control using weight factors that are based on an engine operating parameter, the loss of emissions margin may be reduced. Furthermore, by using two sensors component redundancy may be introduced so that even if one MAT sensor degrades, the engine may continue to operate while complying with emissions regulations. Consequently, only a double degradation of both MAT sensors may further reduce emissions margin.

The first bank of cylinders 62 may be fueled by first fueling system 66 while the second bank of cylinders 64 may be fueled by second fueling system 68. Fueling systems 66 and 68 may include fuel injectors, fuel pumps, fuel rails, etc. In one example, an injection timing (t1 and t2) of the first and second bank of cylinders may be adjusted by engine controller 12 based on the first and second temperatures 102, 104, as estimated by the first and second MAT sensors.

Engine 8 may be controlled at least partially by control system 14 including engine controller 12, locomotive controller 22, and by input from a vehicle operator via an input device (not shown). Engine controller 12 is shown receiving information from a plurality of engine sensors 16 (various examples of which are described herein) and sending control signals to a plurality of engine actuators 91 (various examples of which are described herein). As one example, engine sensors 16 may include exhaust gas sensor 126 (e.g., an exhaust NOx sensor) located in exhaust manifold 48, exhaust temperature sensor 128 located downstream of emission control device 70, and MAT sensors 82 and 84. Various other sensors such as additional pressure, temperature, air/fuel ratio and composition sensors may be coupled to various locations in split engine system 10. As another example, engine actuators 91 may include fuel injectors of fueling systems 66 and 68, and a throttle, if equipped. Other actuators, such as a variety of additional valves, may be coupled to various locations in split engine system 10. Engine controller 12 may receive input data from the various engine sensors, process the input data, and trigger the engine actuators in response to the processed input data based on instruction or code programmed therein corresponding to one or more routines. An example control routine is described herein with regard to FIG. 2.

Engine controller 12 may be coupled to locomotive controller 22 via serial communication link 94, which may include a digital communication channel or data bus where data is communicated, in either direction, one bit at one time, sequentially, over the communication channel or bus. In one example, locomotive controller 22 may be located on the same locomotive. In another example, the locomotive controller may be remotely located, or the locomotive controller may be coupled to a remote controller, for example, at a dispatch center. Locomotive controller 22 is shown receiving information from a plurality of locomotive sensors 17 and sending control signals to a plurality of locomotive actuators 93. As one example, locomotive sensors 17 may include a locomotive position sensor (e.g., GPS device), environmental condition sensor (e.g., for sensing altitude, ambient humidity, temperature, and/or barometric pressure, or the like), a locomotive coupler force sensor, a track grade sensor, a locomotive notch sensor, and a brake position sensor. Various other sensors may be coupled to various locations in the locomotive. As another example, locomotive actuators 93 may include a locomotive throttle notch, air brakes, brake air compressor, traction motors, etc. Other actuators may be coupled to various locations in the locomotive. Locomotive controller 22 may receive inputs from the various locomotive sensors, process the data, and trigger the locomotive actuators in response to the processed input data based on instruction or code programmed therein corresponding to one or more routines. For example, the locomotive controller may determine a locomotive performance plan including locomotive notch and brake settings based on the locomotive operating conditions. Further, locomotive controller 22 may receive (e.g., upload) engine data (as determined by the various engine sensors) from engine controller 12 via the serial communication link 94, process the engine data, determine engine actuator settings, and transfer (e.g., download) instructions or code for triggering the engine actuators based on routines performed by the locomotive controller 22 back on to engine controller 12 via the serial communication link. In one example, the locomotive controller may determine an engine performance plan including engine injection settings based on the engine operating conditions, the locomotive operating conditions, and the locomotive performance plan. An example control routine is described herein with regard to FIG. 3.

In this way, by enabling serial communication between the engine controller and the locomotive controller, a larger range of data may be shared between the controllers. The larger pool of data may then be used to determine (for example, optimize) the engine and locomotive performance plans. In one example, by sharing the data, a larger number of operating modes may be determined for the engine. For example, in some modes, engine speed may be the same but injection timing may differ. As such, fewer operating points may be shared and engine operating points may be selected with higher granularity. For example, injection timings may be adjusted based on differences in altitude, humidity, and/or temperature (ambient or otherwise).

Figure 2:
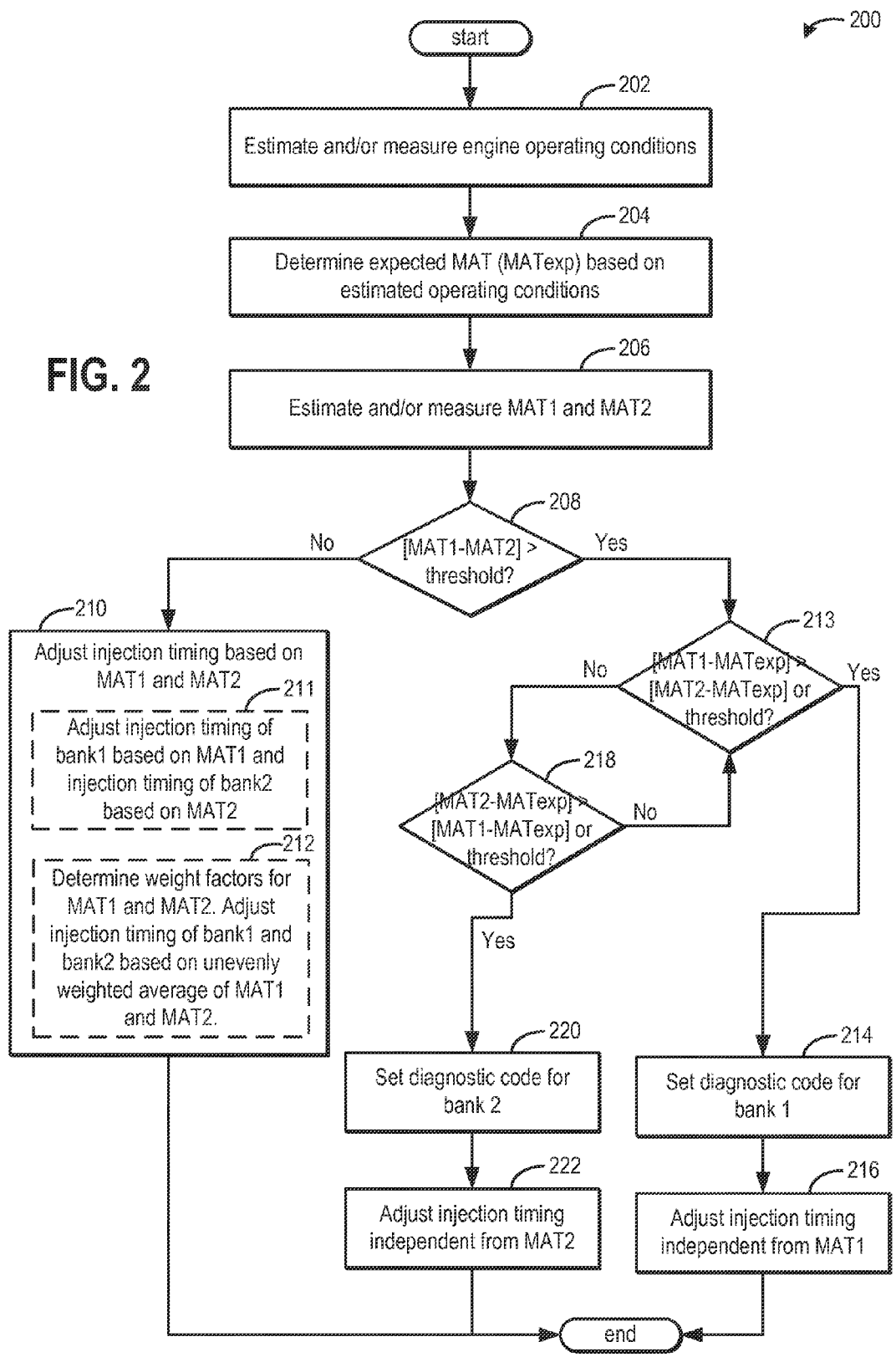
FIG. 2 shows a high level flow chart of an embodiment of a method for adjusting injection timing to the two banks of FIG. 1 responsive to a manifold air temperature of the two banks.

Now turning to FIG. 2, an example routine 200 is depicted for adjusting an engine injection timing based on the respective intake temperature of the first and second banks. By adjusting the injection timing responsive to a temperature of both the banks, more precise injection timing may be achieved, thereby reducing error margins, and improving exhaust emissions and fuel economy. The routine may also diagnose component degradation, such as intercooler degradation. In one example, the routine may be executed by an engine controller, such as an on-board engine controller of a locomotive. In another example, some aspects of the routine may be executed by a locomotive controller, based on data received from the engine controller, and the executed data may then be relayed back to the engine controller, for example via a serial communication link. For example, some diagnostic aspects of routine 200 may be executed by the locomotive controller and based upon the diagnosis, engine setting adjustments may be made and relayed to the engine controller for setting an appropriate diagnostic code and adjusting engine settings accordingly.

At 202, the routine may include, estimating and/or measuring engine operating conditions. Thus, engine operating conditions including an engine speed, engine torque, an amount of boost, a vehicle altitude, an ambient temperature, an ambient pressure, an ambient humidity, engine oil temperature, compressor air pressure, main air reserve pressure, battery voltage, a battery state of charge, brake cylinder pressure, fuel composition (e.g., fuel diesel content or fuel alcohol content) etc., may be determined. In addition, the age of one or more engine components may be determined. As an example, the engine component may include one or more of an exhaust catalyst, an engine manifold, an intercooler, and a fuel injector, In still other embodiments, a season of vehicle operation may be determined based on a calendar date. For example, it may be determined whether the vehicle is being operated during summer and spring months (when average temperatures are higher and a larger number of AESS credits may be earned) or whether the vehicle is being operated during fall and winter months (when average temperatures are lower and a larger number of AESS credits may be applied). At 204, an expected manifold temperature (MATexp) may be determined based on the estimated engine operating conditions. In one example, a model may be used to predict an expected MAT based on the estimated ambient temperature, pressure, altitude, humidity, etc. At 206, a first temperature (MAT1) of the first intake of the first bank of cylinders and a second temperature (MAT2) of the second intake of the second bank of cylinders may be determined. For example, the temperatures may be estimated and/or measured by a first temperature (MAT) sensor 82 in the first intake and a second temperature (MAT) sensor 84 in the second intake, of engine 8. (Unless otherwise specified, the term "estimate" includes a sensor measurement, it being recognized that any sensor measurement may include a small degree of tolerance/error, and may not reflect the exact value of what is sensed).

At 208, it may be determined whether a difference between the first temperature MAT1 and the second temperature MAT2 is greater than a threshold. In one example, the threshold may be based on operating conditions such as an ambient temperature, altitude, humidity, component age, degradation history, prevalent exhaust (e.g., NOx) levels, need for maintenance (e.g., due to a previous determination of degradation), etc. For example, a higher threshold may be applied when the vehicle is travelling at a higher altitude. If the difference between MAT1 and MAT2 is not greater than the threshold, then at 210, the routine may include adjusting engine injection timing based on the first temperature of the first intake of the first bank and the second temperature of the second intake of the second bank. In some embodiments, in addition to confirming that the difference between the first and second temperatures (MAT1 and MAT2) is not greater than a threshold, it may be further confirmed (at 210) that each of the first temperature and the second temperature are within a threshold difference of the expected temperature (MATexp).

In one example, upon confirming that the difference between MAT1 and MAT2 is not substantially high and that each of MAT1 and MAT2 are within a threshold difference of the expected temperature, the adjustment may include, at 211, adjusting the injection timing of fuel injectors coupled to the first bank of cylinders based on the first temperature and independent of the second temperature while adjusting the injection timing of fuel injectors coupled to the second bank of cylinders based on the second temperature and independent of the first temperature. Herein, the bank-specific adjustment, wherein each bank is adjusted based only on the respective bank's temperature, may enable the fueling of each bank to be optimized to meet the emissions regulations while reducing each bank's fuel consumption rate.

In another example, the adjustment may include, at 212, adjusting the injection timing of the first bank and the second bank based on an unevenly weighted average of the first and second temperatures. To compute the unevenly weighted average, a weight factor may be determined for each of the first and second temperatures, including a first, larger weight factor and a second, smaller weight factor. As one example, the unevenly weighted average may include a 60% weighting for the higher of the first and second temperatures and a 40% weighting for the lower of the first and second temperatures.

The weight factors applied may also vary with vehicle operating conditions. For example, during a first condition, the unevenly weighted average may include the larger weight factor for the higher of the first and second temperatures and the smaller weight factor for the lower of the first and second temperatures. As an example, the higher of the first and second temperatures may be weighed more during conditions when the fuel demand is outside of an expected fuel demand. As such, this could also indicate an unhealthy engine condition, such as a weak power assembly, that could cause NOx emissions to be higher than desired. In an alternate example, during a second condition, the unevenly weighted average may include the larger weight factor for the lower of the first and second temperatures and the smaller weight factor for the higher of the first and second temperatures. As an example, the lower of the first and second temperatures may be weighed more during conditions when the fuel pump age is higher and the fuel pump wear is found to decrease NOx emissions. Herein, by using an unevenly weighted average of the estimated temperatures for injection timing control, the risk of being emissions non-compliant or fuel inefficient due to a degraded intercooler may be reduced.

As such, the unevenly weighted average (including the first and second weight factors) may be varied during engine operation based on one or more operating parameters. In one example, the operating parameter is an engine temperature and the varying includes increasing the weighting towards the higher of the first and second temperatures as the engine temperature increases above a threshold temperature. In another example, the operating parameter is an engine component age, and the varying includes increasing weighting towards the higher of the first and second temperatures as the engine component age increases. Herein, the engine component may be one or more of an exhaust catalyst, an engine manifold, an intercooler, and a fuel injector, for example. In yet another example, the operating parameter is an ambient condition (e.g., ambient temperature, ambient humidity, ambient pressure), and the weighting is increased towards the higher of the first and second temperatures as the ambient temperature, pressure, or humidity increases. In still another example, the weighting may be increased towards the higher of the first and second temperatures when the fuel demand is abnormal (e.g., when the actual fuel demand is higher than the expected fuel demand), possibly indicating an unhealthy engine.

In still another example, the varying is based on a season of vehicle operation, wherein the weighting is increased towards the higher of the first and second temperatures during summer and spring seasons, and the weighting increased towards the lower of the first and second temperatures during fall and winter seasons. This allows the uneven weight averaging to take advantage of AESS credits that may be earned/applied differently during different seasons. As such, instead of adjusting the weightings based on the season of vehicle operation, an engine performance recipe, or timing, may be directly adjusted based on the available AESS credits. Likewise, the varying may be based on a fuel type of fuel injected into the engine. For example, the weighting may be increased towards the higher of the first and second temperatures as an alcohol content of the injected fuel increases. Alternatively, in embodiments where the vehicle uses a biodiesel fuel, the weighting may be varied based on the biodiesel content, or biodiesel percentage, in the fuel. In one example, the biodiesel content of the fuel may be inferred from an aromatics content of the fuel. Still other approaches may be used to infer the fuel biodiesel content.

It will be appreciated that while the above examples suggest increasing the weighting towards the higher of the two temperatures, in alternate embodiments, the varying may include shifting the weighted average further away from a mean of the first and second temperatures as an age of an engine component increases. In still another embodiment, the weighted average may be shifted towards the mean. In yet another example, the lower of the two temperatures may be weighed more as an engine component ages and creates lower NOx emissions. As such, this allows for smaller advances in fuel injection timing and better operating fuel consumption.

Returning to 208, if the difference between the first and second temperatures. [MAT1−MAT2](reflecting an absolute value), is greater than the threshold, then the routine may include comparing each of the first and second temperatures to the expected manifold air temperature (MATexp) and confirming whether the difference is greater than a threshold. Specifically at 213, it may be confirmed whether a difference between the first temperature and the expected temperature, [MAT1−MATexp], is greater than the difference between the second temperature and the expected temperature, [MAT2−MATexp]. Alternatively, it may be confirmed whether the difference between the first temperature and the expected temperature (i.e., [MAT1−MATexp]) is greater than a threshold. If the difference is greater than the threshold, then at 214, first intercooler degradation may be determined, and accordingly first intercooler degradation may be indicated by setting a diagnostic code for the first bank.

In comparison, if the difference is not greater than the threshold, or if [MAT1−MATexp] is not greater than [MAT2−MATexp], at 218 it may be confirmed that the difference between the second temperature and the expected temperature, [MAT2−MATexp], is greater than the difference between the first temperature and the expected temperature, [MAT1−MATexp], or greater than the threshold. Accordingly, at 220, second intercooler degradation may be determined, and accordingly second intercooler degradation may be indicated by setting a diagnostic code for the second bank. By comparing the estimated MAT to an expected MAT that is modeled based on prevalent ambient conditions (such as humidity, temperature, altitude, etc.), natural variations in MAT due to changes in ambient conditions may be accounted for. Additionally, by adjusting the threshold responsive to operating conditions such as ambient temperature, altitude, humidity, etc., elevated manifold temperatures responsive to intercooler degradation may be properly distinguished from elevated manifold temperatures responsive to elevated ambient temperatures or elevated altitudes.

It will be appreciated that while the depicted example illustrates determining intercooler degradation based on the difference between the first or second temperature and an expected temperature, in an alternate embodiment, intercooler degradation may be determined only when a difference between the first and second temperatures is greater than a threshold. Further, it will be appreciated that while the depicted embodiment illustrates determination of intercooler degradation, in alternate embodiments, the same or a similar routine may be used to determine MAT sensor degradation in at least one of the first and second bank.

Additional off-board processing may also be possible. For example, in some embodiments, if the controller determines that the estimated MAT (MAT1 and/or MAT2) is above an upper threshold, that is, the MAT is much higher than desired, or if the difference between MAT1 and MAT2 is higher than desired, the controller may anticipate substantial emissions and in addition to setting a diagnostic code for a degraded component, the controller may notify the locomotive controller and/or a central management unit (or fleet controller) of a potentially emissions non-compliant locomotive.

Following determination of intercooler degradation, the engine injection timing may be further adjusted based on the determination of degradation, the adjustment including adjusting the injection timing independent from the temperature of the bank with the one degraded intercooler. Thus, following determination of first intercooler degradation at 214, routine 200 may include, at 216, adjusting the injection timing of the engine independent from the first temperature. For example, the injection timing of the first and second banks may be adjusted based on the second temperature only. Similarly, following determination of second intercooler degradation at 220, routine 200 may include, at 222, adjusting the injection timing of the engine independent from the second temperature. For example, the injection timing of the first and second banks may be adjusted based on the first temperature only.

Figure 3:
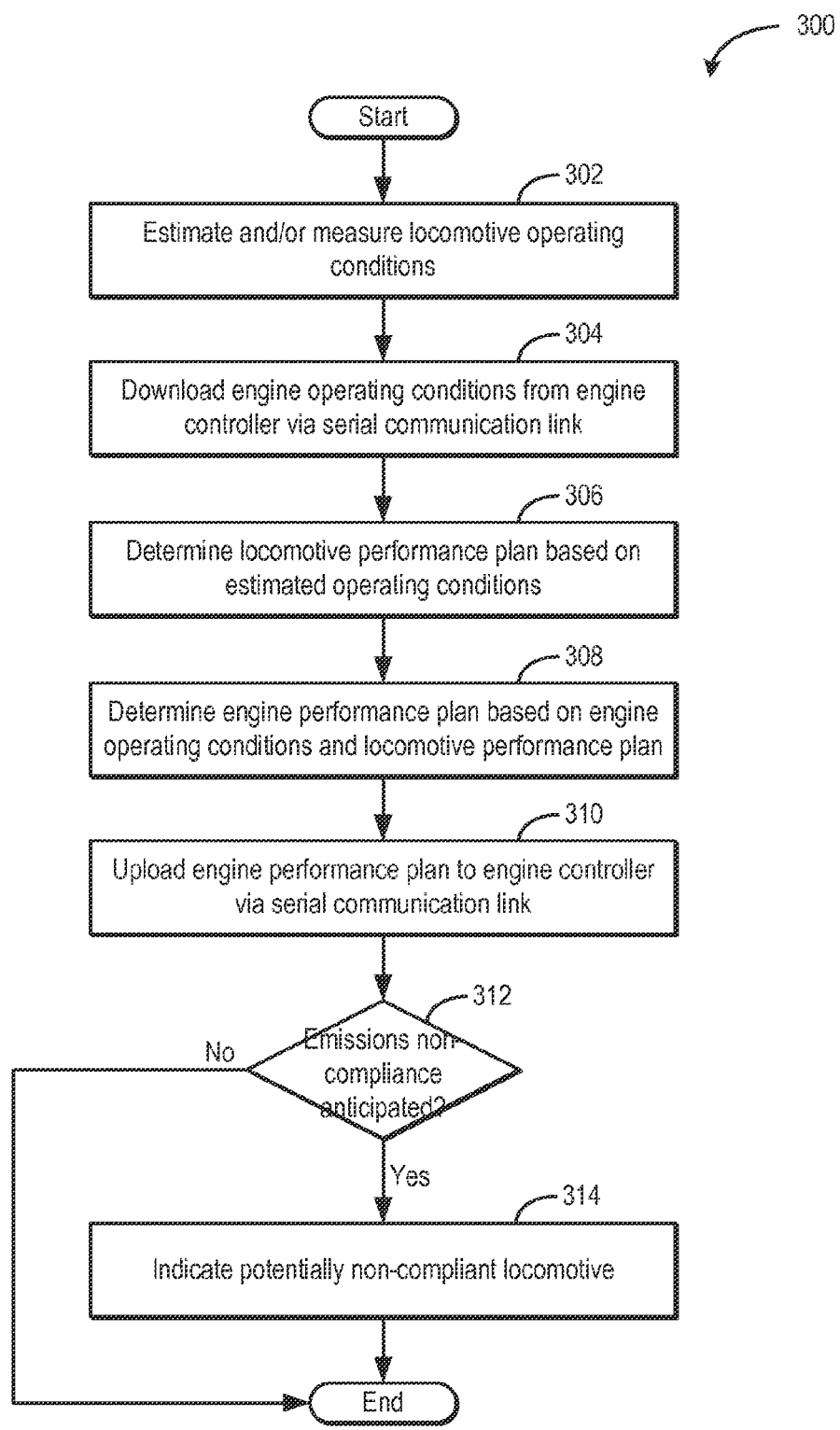
FIG. 3 shows a high level flow chart of an embodiment of a method for coordination of locomotive control and engine control via a serial communication link.

In one example, as further elaborated with reference to FIG. 3, the diagnosis of intercooler degradation and the adjustments to injection timing based on intercooler degradation may be determined by a locomotive controller coupled to the on-board engine controller via a serial communication link. For example, data such as the estimated engine operating conditions, including the first and second temperatures as estimated by the first and second MAT sensors, may be uploaded from the engine controller to the locomotive controller via the serial communication link. Injection timings may then be adjusted by the locomotive controller based on the determination of degradation, and other locomotive operating conditions, such as an amount of Auto engine start stop (AESS) operations performed (or opportunities available). For example, the locomotive controller may determine adjusted injection timings as part of a trip optimization routine. The adjusted settings may then be transferred from the locomotive controller to the engine controller and the engine may be operated accordingly.

In this way, temperature input received from two distinct temperature sensors in the two banks of the engine may be used to more accurately determine an intake air charge temperature thereby enabling emission NOx levels to be more precisely inferred. By determining an injection timing (e.g., an injection timing retard) based on the more accurate air charge estimation, exhaust emissions may be better addressed while being more fuel efficient.

Additionally, degradation of one of the first and/or second intercooler may be determined based on the first and second temperature inputs, and the injection timing may be further adjusted based on the determination of intercooler degradation. In this way, component damage may be rapidly determined and addressed. By adjusting the injection timing based on the intercooler degradation, specifically by adjusting the injection timing in accordance with the temperature from the bank with the degraded intercooler (and independent from the temperature of the other bank), emissions compliance of the engine may be better assured. For example, injection timing may be adjusted in the bank with the degraded intercooler (or in all cylinders) based on the temperature of that bank to provide greater injection timing retard on the bank with the degraded intercooler, as compared with the other bank. In this way, emissions compliance is provided, even with differential degradation between the different bank-specific intercoolers.

In an example where the system determines that one of the MAT sensors is degraded, injection timing of all cylinders of the engine may be adjusted independent of the temperature from the bank with the degraded MAT sensor.

Thus, an engine controller may be configured to adjust an injection timing of a fuel injector coupled to the first bank and a fuel injector coupled to the second bank based on an unevenly weighted average of the first and second temperatures when each of the first and second temperatures are within a threshold difference of an expected temperature, the expected temperature based on engine operating conditions. In comparison, the controller may adjust an injection timing of the fuel injector coupled to the first bank and the fuel injector coupled to the second bank based on the first temperature and independent of the second temperature when the first temperature is within the threshold difference of the expected temperature and the second temperature is outside the threshold difference of the expected temperature, while adjusting the injection timing of the fuel injector coupled to the first bank and the fuel injector coupled to the second bank based on the second temperature and independent of the first temperature when the second temperature is within the threshold difference of the expected temperature and the first temperature is outside the threshold difference of the expected temperature.

Now turning to FIG. 3, an example routine 300 is illustrated for coordinating operations between an engine controller and a locomotive controller via a serial communication link. In one example, the depicted routine may be executed by the locomotive controller, based on information received from the engine controller, to determine an engine performance plan including engine settings and/or a locomotive performance plan, including locomotive settings. The determined settings may then be relayed back to the engine controller for operating an engine accordingly.

At 302, the routine may determine locomotive operating conditions. This may include, for example, a locomotive position, a locomotive configuration, coupler forces, tractive efforts (TE) and TE limits, mission details (e.g., starting point, ending point, starting time, ending time, number and position of stops), track details (e.g., grade, crest and/or sags, regions of undulation), weather details along the route, cargo details (e.g., nature of cargo, tonnage), etc. At 304, the routine may include downloading engine operating conditions from an on-board engine controller onto the locomotive controller via a serial communication link. The engine operating conditions may include, for example, an engine speed, an engine oil temperature, intake temperatures as estimated by the first and second MAT sensors, engine coolant temperature, engine torque, AESS operations and their details, engine boost, etc.

At 306, the routine may include determining a locomotive performance plan, including locomotive settings, based on the estimated (locomotive and/or engine) operating conditions. In one example, the locomotive controller may use mission optimization or planning software for determining the locomotive performance plan. The locomotive settings determined therein may include, for example, a locomotive notch and brake setting. At 308, based on the locomotive performance plan and further based on the estimated operating conditions, an engine performance plan, including engine settings, may be determined. The engine settings may include, for example, injection timings, an amount of injection timing retard, valve and/or cam timings, boost settings, spark timing, etc. In one example, the mission optimization or planning software may be used to also determine the engine performance plan. At 310, the engine performance plan may be uploaded to the engine controller via the serial communication link. The locomotive engine may then be operated based on the engine performance plan and the determined engine settings.

For example, based on the estimated locomotive operating conditions (e.g., track details), the locomotive controller may determine a steep grade in certain segments of the planned route. Based on the steep grade determination, the locomotive controller may determine a locomotive performance plan, including, for example, a higher throttle notch setting for the region with the steep grade. In another example, the locomotive may be one of a plurality of locomotives in a consist, and based on the determination of a region of undulation in the planned route, the locomotive controller may determine a locomotive performance plan including different throttle notch settings to the plurality of locomotives of the consist during the region of undulation.

In yet another example, based on engine and/or locomotive operating conditions (e.g., battery state, track details, ambient temperatures, or the like) and/or regions of undulations, the locomotive controller may identify AESS opportunities, that is, segments of the locomotive journey wherein the idle locomotive may be auto-stopped and/or segments where the auto-stopped locomotive may be auto-started, to thereby enable fuel savings and exhaust emissions reduction. The locomotive controller may then determine a locomotive performance plan based on the AESS opportunities. The locomotive controller may receive information regarding engine operating conditions, including a first and second temperature of the first and second banks, and determine settings in an engine performance plan based on the engine and/or locomotive operating conditions, and based on the locomotive performance plan. For example, the locomotive controller may determine an engine injection timing based on the first and second temperature and further based on the presence or absence of AESS opportunities. For example, in the presence of AESS opportunities, the locomotive controller may estimate an amount of idle reduction time and may further compute potential emissions credits related to the AESS operation and adjust the injection timing accordingly. For example, an amount of injection timing retard may be adjusted based on whether AESS opportunities are present or not. In another example, the thresholds in the engine performance plan are based on the AESS opportunities. For example, a higher temperature threshold may be applied for injection timing retard in the presence of AESS opportunities. Likewise, weight factors for determining an unevenly weighted average of the first and second temperatures may be based on the presence of AESS credits. Thus, during summer months, when AESS credits are available, the weight factors may be shifted away from a mean average timing while during winter months, the weight factors may be shifted towards a mean average timing. That is, in summer, when AESS is more active, the lower of the first and second temperatures may be weighed more, while in winter, the when AESS is less active, the higher of the first and second temperatures may be weighed more.

At 312, it may be determined whether emissions loss of margin of the locomotive is anticipated. In one example, the locomotive may be anticipated to be emissions non-compliant based on highly elevated MAT levels and/or a highly elevated difference between the MAT readings of the two banks. In another example, the locomotive may be anticipated to be emissions non-compliant based on a degree of intercooler degradation. If emissions loss of margin is anticipated, then at 314, the locomotive may be flagged and a central management unit or fleet controller may be informed about a potentially non-compliant locomotive. In one example, the locomotive controller may set a diagnostic code indicating locomotive emission non-compliance, for example, via satellite communication. If non-compliance is not anticipated, the routine may end.

The engine operating conditions may be communicated between the engine controller and the locomotive controller in real-time, such as during locomotive operation. For example, engine operating conditions may be downloaded from the engine controller at regular and/or predetermined intervals (e.g., once an hour, once a day, or the like). Then, based on changes in engine operating conditions, the locomotive controller may compute alternate settings (or adjust the settings) to improve engine performance and relay them back to the engine controller. For example, adjusted engine settings may be uploaded to the engine controller at regular and/or predetermined intervals (e.g., once an hour, in the event of setting changes, or the like).

In another example, the engine operating conditions may be communicated between the engine controller and the locomotive controller before the dispatch of the locomotive. Herein, the engine performance plan may be determined by the locomotive controller before dispatch and downloaded to the engine controller at the time of locomotive dispatch so that the engine may operate accordingly. In still another example, a first engine performance plan may be determined by the locomotive controller before the start of the locomotive's mission, and then during the mission, engine operating conditions may be continuously monitored and relayed to the locomotive controller for further adjustments and updates, and a second performance plan may be relayed back to the engine controller during the mission, as and when engine performance improvement opportunities arise. In yet another example, the engine controller determines the performance plan based on sensor and locomotive controller input.

As previously elaborated, the locomotive and/or engine controller may also be configured to perform diagnostics routines wherein the engine operating conditions are processed for diagnostic purposes. Further, in the event of degradation determination, for example of a hardware component, an engine performance plan update may be made and downloaded to the on-board engine controller.

In one example scenario, the first temperature of the first bank may be 70° C. while the temperature of the second bank may be 76° C. Further, the expected temperature may be 80° C. Herein, the controller may determine engine injection timing based on an average (e.g., mean or weighted average) of the temperatures. For example, the controller may determine injection timing (of both the banks) based on an unevenly weighted average engine temperature of 74° C. Alternatively, the controller may determine an injection timing of each bank based on the corresponding bank's temperature. Further, based on the difference between the first and second banks being less than a threshold (e.g., less than 10° C.), the controller may determine that no intercooler is degraded. Additionally, or optionally, the controller may determine no intercooler degradation based on the difference between the first temperature and the expected temperature being less than a threshold (e.g., less than 10° C.), and based on the difference between the second temperature and the expected temperature being less than a threshold (e.g., less than 10° C.).

In another example scenario, the first temperature of the first bank may be 90° C. while the second temperature of the second bank may be 125° C. Further, the expected temperature may be 100° C. Herein, based on the difference between the first and second banks being greater than the threshold, the controller may determine intercooler degradation in the second bank. Additionally, or optionally, the controller may determine second intercooler degradation based on the difference between the first temperature and the expected temperature being less than a threshold, and based on the difference between the second temperature and the expected temperature being greater than the threshold.

The thresholds may be adjusted by the controller based on the operating conditions. For example, a higher temperature threshold may be applied at higher altitudes while a lower threshold may be applied at lower altitudes. In another example, a lower threshold may be applied during higher component age and a higher threshold may be applied during lower component age. While the abovementioned examples includes the same threshold for the first and second intercooler degradation determination, it will be appreciated that in alternate embodiments, the thresholds may vary for each bank, for example, based on an age and degradation history of each bank's intercooler (or other component). For example, following the determination of second intercooler degradation, the threshold for the second bank may be adjusted while the threshold for the first bank may be maintained.

Based on the determination of degradation of one of the intercoolers, the engine controller may adjust engine injection timing (e.g., an injection timing setting in an engine performance plan) of both the banks based on the temperature of the bank with the degraded intercooler. For example, in the above-mentioned scenario, the controller may adjust an injection timing of both the banks independent of the first temperature of the first bank (i.e., based on 90° C.) and based on the second temperature of the second bank (i.e., based on 125° C.). In an alternative example, the controller may adjust an injection timing of the first bank based on the first temperature of the first bank (i.e., based on 90° C.) and adjust the injection timing to a greater degree than the first bank (e.g., greater amount of injection timing retard) based on the second temperature of the second bank (i.e., based on 125° C.). Herein, the higher of the first and temperatures may have a 100% weighting.

In one example, the controller may include a computer readable storage medium with code therein for adjusting the injection timings based on the estimated temperatures and for performing the diagnostic routines. In another example, the control system may be configured as part of a kit, such as an upgrade kit that may be retrofitted in locomotives, for ensuring tighter emissions compliance. In one example, the kit may include a re-programmed engine control unit, reprogrammed locomotive controller, additional MAT sensors, a serial communication device, new or upgraded software for the engine control unit, new or upgraded software for the locomotive controller, etc. For example, the kit may include a replacement panel that may be fitted on the engine control unit and/or locomotive controller.

An embodiment relates to a kit for a locomotive engine including a first bank of cylinders and a second bank of cylinders. The kit includes a first temperature sensor, a second temperature sensor, a control system, and a serial communication device. The first temperature sensor is configured to determine a first temperature of a first intake of the first bank of cylinders. The second temperature sensor is configured to determine a second temperature of a second intake of the second bank of cylinders. The control system has computer readable storage medium with code therein; the code carries instructions for adjusting an injection timing of the engine based on the first and second temperatures. The serial communication device is configured to link the control system with a locomotive control system for serial communications therebetween.

In another embodiment of the kit, the locomotive engine further includes a first intercooler in the first intake and a second intercooler in the second intake. The control system further includes code with instructions for determining degradation of at least one of the first and second intercooler based on the first and/or second temperatures.

In another embodiment of the kit, the control system is configured to transfer information regarding injection timing and intercooler degradation to the locomotive control system via the serial communication device. The control system is also configured to receive a further adjusted injection timing, which is based on the intercooler degradation, from the locomotive control system via the serial communication device.

In this way, by using temperature inputs from each bank of a locomotive engine to adjust injection timing, injection timing control may be improved, emissions margins may be reduced, and fuel savings may be improved. Thus, locomotive emissions may be controlled while optimizing an engine and locomotive performance.

In an embodiment, as discussed above, the first temperature MAT1 is estimated by a first temperature sensor 82 in the first intake 30, and the second temperature MAT2 is estimated by a second temperature sensor 84 in the second intake 32. Each intake is a separate and distinct fluid passageway (e.g., for carrying compressed air), and the two temperatures MAT1, MAT2 are also separate and distinct, that is, the first temperature MAT1 is of air in the first intake manifold 30, and the second temperature MAT2 is of different air in the second intake manifold 32. If the intakes 30, 32 share a common entry point 42, 44, then the two temperatures may be based on a common temperature of intake air (e.g., at 42). However, the temperatures may be different due to distinct factors that may change the respective temperature in each intake, such as operation and condition of the intercoolers 34, 36.

In an embodiment, a method of operating an engine comprises adjusting (e.g., with a controller) an injection timing of a first fuel injector coupled to a first cylinder in a first bank of cylinders and an injection timing of a second fuel injector coupled to a second cylinder in a second bank of cylinders based on a ratio of a first temperature of a first intake of the first bank and a second temperature of a second intake of the second bank.

In an embodiment, a method of operating an engine comprises adjusting (e.g., with a controller) an injection timing of a first fuel injector coupled to a first cylinder in a first bank of cylinders and an injection timing of a second fuel injector coupled to a second cylinder in a second bank of cylinders based on a ratio of a first temperature of a first intake of the first bank and a second temperature of a second intake of the second bank. The method further comprises determining the ratio as a weighted average based on at least one of the first temperature at the first intake or the second temperature at the second intake, and an estimate or a measured temperature at the other of the first intake or the second intake.

In an embodiment, a method of operating an engine comprises adjusting (e.g., with a controller) an injection timing of a first fuel injector coupled to a first cylinder in a first bank of cylinders and an injection timing of a second fuel injector coupled to a second cylinder in a second bank of cylinders based on a ratio of a first temperature of a first intake of the first bank and a second temperature of a second intake of the second bank. The method further comprises determining the ratio as a weighted average based on at least one of the first temperature at the first intake or the second temperature at the second intake, and an estimate or a measured temperature at the other of the first intake or the second intake. The method further comprises changing the weighting during engine operation based on a corresponding change to an operating parameter of the engine.

In an embodiment, a method of operating an engine comprises adjusting (e.g., with a controller) an injection timing of a first fuel injector coupled to a first cylinder in a first bank of cylinders and an injection timing of a second fuel injector coupled to a second cylinder in a second bank of cylinders based on a ratio of a first temperature of a first intake of the first bank and a second temperature of a second intake of the second bank. The method further comprises determining the ratio as a weighted average based on at least one of the first temperature at the first intake or the second temperature at the second intake, and an estimate or a measured temperature at the other of the first intake or the second intake. The method further comprises changing the weighting during engine operation based on a corresponding change to an operating parameter of the engine, and increasing weighting towards the higher of the first and second temperatures as an engine temperature increases above a threshold temperature.

In an embodiment, a method of operating an engine comprises adjusting (e.g., with a controller) an injection timing of a first fuel injector coupled to a first cylinder in a first bank of cylinders and an injection timing of a second fuel injector coupled to a second cylinder in a second bank of cylinders based on a ratio of a first temperature of a first intake of the first bank and a second temperature of a second intake of the second bank. The method further comprises determining the ratio as a weighted average based on at least one of the first temperature at the first intake or the second temperature at the second intake, and an estimate or a measured temperature at the other of the first intake or the second intake. The method further comprises changing the weighting during engine operation based on a corresponding change to an operating parameter of the engine, and determining an age of an engine component, and increasing weighting towards the higher of the first and second temperatures in response to an increase in the engine component age. The engine component may include, for example, one or more of an exhaust catalyst, an engine manifold, or a fuel injector.

In an embodiment, a method of operating an engine comprises adjusting (e.g., with a controller) an injection timing of a first fuel injector coupled to a first cylinder in a first bank of cylinders and an injection timing of a second fuel injector coupled to a second cylinder in a second bank of cylinders based on a ratio of a first temperature of a first intake of the first bank and a second temperature of a second intake of the second bank. The method further comprises determining the ratio as a weighted average based on at least one of the first temperature at the first intake or the second temperature at the second intake, and an estimate or a measured temperature at the other of the first intake or the second intake. The method further comprises changing the weighting during engine operation based on a corresponding change to an operating parameter of the engine, and determining an ambient temperature, and increasing the weighting towards the higher of the first and second temperatures in response to an increase in the determined ambient temperature.

In an embodiment, a method of operating an engine comprises adjusting (e.g., with a controller) an injection timing of a first fuel injector coupled to a first cylinder in a first bank of cylinders and an injection timing of a second fuel injector coupled to a second cylinder in a second bank of cylinders based on a ratio of a first temperature of a first intake of the first bank and a second temperature of a second intake of the second bank. The method further comprises determining the ratio as a weighted average based on at least one of the first temperature at the first intake or the second temperature at the second intake, and an estimate or a measured temperature at the other of the first intake or the second intake. The method further comprises changing the weighting during engine operation based on a corresponding change to an operating parameter of the engine, and determining an ambient humidity or pressure, the weighting increased towards the higher of the first and second temperatures in response to an increase in the determined ambient humidity or pressure.

In an embodiment, a method of operating an engine comprises adjusting (e.g., with a controller) an injection timing of a first fuel injector coupled to a first cylinder in a first bank of cylinders and an injection timing of a second fuel injector coupled to a second cylinder in a second bank of cylinders based on a ratio of a first temperature of a first intake of the first bank and a second temperature of a second intake of the second bank. The method further comprises determining the ratio as a weighted average based on at least one of the first temperature at the first intake or the second temperature at the second intake, and an estimate or a measured temperature at the other of the first intake or the second intake. The method further comprises changing the weighting during engine operation based on a corresponding change to an operating parameter of the engine, and changing an opening duration of the fuel injector to change an amount of diesel fuel supplied to the first cylinder to control a fuel diesel content of a fuel composition supplied to the first cylinder.

In an embodiment, a method of operating an engine comprises adjusting (e.g., with a controller) an injection timing of a first fuel injector coupled to a first cylinder in a first bank of cylinders and an injection timing of a second fuel injector coupled to a second cylinder in a second bank of cylinders based on a ratio of a first temperature of a first intake of the first bank and a second temperature of a second intake of the second bank. The method further comprises determining the ratio as a weighted average based on at least one of the first temperature at the first intake or the second temperature at the second intake, and an estimate or a measured temperature at the other of the first intake or the second intake. The method further comprises changing the weighting during engine operation based on a corresponding change to an operating parameter of the engine, and determining a season of vehicle operation, and increasing the weighting towards the higher of the first and second temperatures during summer and spring seasons, and increasing the weighting towards the lower of the first and second temperatures during fall and winter seasons.

In an embodiment, a method of operating an engine comprises adjusting (e.g., with a controller) an injection timing of a first fuel injector coupled to a first cylinder in a first bank of cylinders and an injection timing of a second fuel injector coupled to a second cylinder in a second bank of cylinders based on a ratio of a first temperature of a first intake of the first bank and a second temperature of a second intake of the second bank. The method further comprises determining the ratio as a weighted average based on at least one of the first temperature at the first intake or the second temperature at the second intake, and an estimate or a measured temperature at the other of the first intake or the second intake. The method further comprises changing the weighting during engine operation based on a corresponding change to an operating parameter of the engine, and determining a fuel composition to be injected into the engine, and increasing the weighting towards the higher of the first and second temperatures as an alcohol content of the injected fuel composition increases.

In an embodiment, a method of operating an engine comprises adjusting (e.g., with a controller) an injection timing of a first fuel injector coupled to a first cylinder in a first bank of cylinders and an injection timing of a second fuel injector coupled to a second cylinder in a second bank of cylinders based on a ratio of a first temperature of a first intake of the first bank and a second temperature of a second intake of the second bank. The method further comprises determining the ratio as a weighted average based on at least one of the first temperature at the first intake or the second temperature at the second intake, and an estimate or a measured temperature at the other of the first intake or the second intake. The method further comprises changing the weighting during engine operation based on a corresponding change to an operating parameter of the engine, and determining a fuel composition to be injected into the engine, the weighting increased towards the higher of the first and second temperatures as a natural gas content of the injected fuel composition increases.

In an embodiment, a method of operating an engine comprises adjusting (e.g., with a controller) an injection timing of a first fuel injector coupled to a first cylinder in a first bank of cylinders and an injection timing of a second fuel injector coupled to a second cylinder in a second bank of cylinders based on a ratio of a first temperature of a first intake of the first bank and a second temperature of a second intake of the second bank. The method further comprises determining the ratio as a weighted average based on at least one of the first temperature at the first intake or the second temperature at the second intake, and an estimate or a measured temperature at the other of the first intake or the second intake. The method further comprises changing the weighting during engine operation based on a corresponding change to an operating parameter of the engine, and determining a fuel composition to be injected into the engine, the weighting being based at least in part on the first and second temperatures relative to each other and on a natural gas content of the injected fuel composition.

In an embodiment, a method of operating an engine comprises adjusting (e.g., with a controller) an injection timing of a first fuel injector coupled to a first cylinder in a first bank of cylinders and an injection timing of a second fuel injector coupled to a second cylinder in a second bank of cylinders based on a ratio of a first temperature of a first intake of the first bank and a second temperature of a second intake of the second bank. The method further comprises determining the ratio as a weighted average based on at least one of the first temperature at the first intake or the second temperature at the second intake, and an estimate or a measured temperature at the other of the first intake or the second intake. The weighting is further based on a diesel content of an injected fuel composition.

In an embodiment, a method of operating an engine comprises adjusting (e.g., with a controller) an injection timing of a first fuel injector coupled to a first cylinder in a first bank of cylinders and an injection timing of a second fuel injector coupled to a second cylinder in a second bank of cylinders based on a ratio of a first temperature of a first intake of the first bank and a second temperature of a second intake of the second bank. The method further comprises controlling an injection pressure to control an amount of fuel provided by one or both of the first or second fuel injector.

In another embodiment, a method of controlling an engine including a first bank of cylinders and a second bank of cylinders comprises compressing air through a compressor to form compressed air, splitting the compressed air downstream of the compressor, directing at least some compressed air to a first intake of the first bank via a first intercooler, directing at least some compressed air to a second intake of the second bank via a second intercooler, determining a first temperature of the first intake, determining a second temperature of the second intake, and determining an expected temperature based on engine operating conditions. The method further comprises adjusting (e.g., with a controller) an injection timing of a fuel injector coupled to the first bank and a fuel injector coupled to the second bank based on an unevenly weighted average of the first temperature and the second temperature when each of the first temperature and the second temperature are within a threshold difference of the expected temperature.

In another embodiment, a method of controlling an engine including a first bank of cylinders and a second bank of cylinders comprises compressing air through a compressor to form compressed air, splitting the compressed air downstream of the compressor, directing at least some compressed air to a first intake of the first bank via a first intercooler, directing at least some compressed air to a second intake of the second bank via a second intercooler, determining a first temperature of the first intake, determining a second temperature of the second intake, and determining an expected temperature based on engine operating conditions. The method further comprises adjusting (e.g., with a controller) an injection timing of a fuel injector coupled to the first bank and a fuel injector coupled to the second bank based on an unevenly weighted average of the first temperature and the second temperature when each of the first temperature and the second temperature are within a threshold difference of the expected temperature. If the first temperature is within the threshold difference of the expected temperature and the second temperature is outside the threshold difference of the expected temperature, further comprising adjusting the injection timing of the fuel injector coupled to the first bank and the fuel injector coupled to the second bank based on the first temperature and independent of the second temperature, and when the second temperature is within the threshold difference of the expected temperature and the first temperature is outside the threshold difference of the expected temperature, adjusting the injection timing of the fuel injector coupled to the first bank and the fuel injector coupled to the second bank based on the second temperature and independent of the first temperature.

In an embodiment, an engine system comprises a first fuel injector coupled to a first cylinder in a first bank of cylinders, a second fuel injector coupled to a second cylinder in a second bank of cylinders, at least one temperature sensor configured to determine a manifold air temperature (MAT) of at least the first bank of cylinders, and a controller. The controller is operable to receive the determined manifold air temperature from the at least one sensor, and is further operable to calculate a temperature ratio of the first bank of cylinders relative to the second bank of cylinders, and is further operable to adjust an operation of the at least one of the first fuel injector or the second fuel injector based at least in part on the calculated temperature ratio.

In an embodiment, an engine system comprises a first fuel injector coupled to a first cylinder in a first bank of cylinders, a second fuel injector coupled to a second cylinder in a second bank of cylinders, at least one temperature sensor configured to determine a manifold air temperature (MAT) of at least the first bank of cylinders, and a controller. The controller is operable to receive the determined manifold air temperature from the at least one sensor, and is further operable to calculate a temperature ratio of the first bank of cylinders relative to the second bank of cylinders, and is further operable to adjust an operation of the at least one of the first fuel injector or the second fuel injector based at least in part on the calculated temperature ratio. The controller is further operable to determine a manifold air temperature of the second bank of cylinders.

In an embodiment, an engine system comprises a first fuel injector coupled to a first cylinder in a first bank of cylinders, a second fuel injector coupled to a second cylinder in a second bank of cylinders, at least one temperature sensor configured to determine a manifold air temperature (MAT) of at least the first bank of cylinders, and a controller. The controller is operable to receive the determined manifold air temperature from the at least one sensor, and is further operable to calculate a temperature ratio of the first bank of cylinders relative to the second bank of cylinders, and is further operable to adjust an operation of the at least one of the first fuel injector or the second fuel injector based at least in part on the calculated temperature ratio. The controller is further operable to determine a fuel composition to be injected into at least the first cylinder, and to adjust the operation of the first fuel injector based further on one or both of a fuel diesel content or a natural gas content of the injected fuel composition.

Unless otherwise specified (such as in the claims), embodiments of the invention are applicable to vehicles generally, and/or to vehicles with diesel engines. Thus, any instances of "locomotive" herein refer more generally to a vehicle, unless otherwise specified.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims. Moreover, unless specifically stated otherwise, any use of the terms first, second, etc., do not denote any order or importance, but rather the terms first, second, etc. are used to distinguish one element from another.

The invention claimed is:
1. A method of operating an engine, comprising,
adjusting an injection timing of a first fuel injector coupled to a first cylinder in a first bank of cylinders and an injection timing of a second fuel injector coupled to a second cylinder in a second bank of cylinders based on a ratio of a first temperature of a first intake of the first bank and a second temperature of a second intake of the second bank.

2. The method of claim 1, further comprising determining the ratio as a weighted average based on at least one of the first temperature at the first intake or the second temperature at the second intake, and an estimate or a measured temperature at the other of the first intake or the second intake.

3. The method of claim 2, further comprising changing the weighting during engine operation based on a corresponding change to an operating parameter of the engine.

4. The method of claim 3, further comprising increasing weighting towards the higher of the first and second temperatures as an engine temperature increases above a threshold temperature.

5. The method of claim 3, further comprising determining an age of an engine component, and increasing weighting towards the higher of the first and second temperatures in response to an increase in the engine component age.

6. The method of claim 5, wherein the engine component includes one or more of an exhaust catalyst, an engine manifold, or a fuel injector.

7. The method of claim 3, further comprising determining an ambient temperature, and increasing the weighting towards the higher of the first and second temperatures in response to an increase in the determined ambient temperature.

8. The method of claim 3, further comprising determining an ambient humidity or pressure, the weighting increased towards the higher of the first and second temperatures in response to an increase in the determined ambient humidity or pressure.

9. The method of claim 3, further comprising changing an opening duration of the fuel injector to change an amount of diesel fuel supplied to the first cylinder to control a fuel diesel content of a fuel composition supplied to the first cylinder.

10. The method of claim 3, further comprising determining a season of vehicle operation, and increasing the weighting towards the higher of the first and second temperatures during summer and spring seasons, and increasing the weighting towards the lower of the first and second temperatures during fall and winter seasons.

11. The method of claim 3, further comprising determining a fuel composition to be injected into the engine, and increasing the weighting towards the higher of the first and second temperatures as an alcohol content of the injected fuel composition increases.

12. The method of claim 3, further comprising determining a fuel composition to be injected into the engine, the weighting increased towards the higher of the first and second temperatures as a natural gas content of the injected fuel composition increases.

13. The method of claim 3, further comprising determining a fuel composition to be injected into the engine, the weighting being based at least in part on the first and second temperatures relative to each other and on a natural gas content of the injected fuel composition.

14. The method of claim 2, wherein the weighting is further based on a diesel content of an injected fuel composition.

15. The method of claim 1, further comprising controlling an injection pressure to control an amount of fuel provided by one or both of the first or second fuel injector.

16. A method of controlling an engine including a first bank of cylinders and a second bank of cylinders, comprising, compressing air through a compressor to form compressed air;

splitting the compressed air downstream of the compressor;

directing at least some compressed air to a first intake of the first bank via a first intercooler;

directing at least some compressed air to a second intake of the second bank via a second intercooler;

determining a first temperature of the first intake;

determining a second temperature of the second intake;

determining an expected temperature based on engine operating conditions; and adjusting an injection timing of a fuel injector coupled to the first bank and a fuel injector coupled to the second bank based on an unevenly weighted average of the first temperature and the second temperature when each of the first temperature and the second temperature are within a threshold difference of the expected temperature.

17. The method of claim 16, wherein if the first temperature is within the threshold difference of the expected temperature and the second temperature is outside the threshold difference of the expected temperature, further comprising adjusting the injection timing of the fuel injector coupled to the first bank and the fuel injector coupled to the second bank based on the first temperature and independent of the second temperature, and when the second temperature is within the threshold difference of the expected temperature and the first temperature is outside the threshold difference of the expected temperature, adjusting the injection timing of the fuel injector coupled to the first bank and the fuel injector coupled to the second bank based on the second temperature and independent of the first temperature.

18. An engine system, comprising:

a first fuel injector coupled to a first cylinder in a first bank of cylinders;

a second fuel injector coupled to a second cylinder in a second bank of cylinders;

at least one temperature sensor configured to determine a manifold air temperature (MAT) of at least the first bank of cylinders; and a controller operable to receive the determined manifold air temperature from the at least one sensor, and further operable to calculate a temperature ratio of the first bank of cylinders relative to the second bank of cylinders, and further operable to adjust an operation of the at least one of the first fuel injector or the second fuel injector based at least in part on the calculated temperature ratio.

19. The system of claim 18, wherein the controller is further operable to determine a manifold air temperature of the second bank of cylinders.

20. The system of claim 18, wherein the controller is further operable to:

determine a fuel composition to be injected into at least the first cylinder; and adjust the operation of the first fuel injector based further on one or both of a fuel diesel content or a natural gas content of the injected fuel composition.

* * * * *

UNITED STATES PATENT AND TRADEMARK OFFICE
CERTIFICATE OF CORRECTION

| | | |
|---|---|---|
| PATENT NO. | : 9,194,325 B2 | Page 1 of 1 |
| APPLICATION NO. | : 14/546449 | |
| DATED | : November 24, 2015 | |
| INVENTOR(S) | : Goes et al. | |

It is certified that error appears in the above-identified patent and that said Letters Patent is hereby corrected as shown below:

In the specification

In Column 1, Line 8, delete "2011," and insert -- 2011, now Pat. No. 8,903,623, --, therefor.

In Column 7, Line 28, delete "injector," and insert -- injector. --, therefor.

In the claims

In Column 20, Line 63, in Claim 1, delete "comprising," and insert -- comprising: --, therefor.

In Column 21, Line 64, in Claim 16, delete "comprising," and insert -- comprising: --, therefor.

Signed and Sealed this
First Day of March, 2016

Michelle K. Lee
*Director of the United States Patent and Trademark Office*